United States Patent [19]

Josso et al.

[11] Patent Number: 5,776,620
[45] Date of Patent: Jul. 7, 1998

[54] PROCESS FOR THE ASSEMBLY OF CERAMIC AND REFRACTORY ALLOY PARTS

[75] Inventors: Pierre Josso, Issy Les Moulinbaux; Serge Alperine, Paris, both of France

[73] Assignee: Office National D'Etudes et de Recherches Aerospatiales, Chatillon, France

[21] Appl. No.: 583,029

[22] PCT Filed: May 22, 1995

[86] PCT No.: PCT/FR95/00671

§ 371 Date: Jan. 22, 1996

§ 102(e) Date: Jan. 22, 1996

[87] PCT Pub. No.: WO95/32163

PCT Pub. Date: Nov. 30, 1995

[30] Foreign Application Priority Data

May 25, 1994 [FR] France .................................. 94/06344

[51] Int. Cl.$^6$ .................................................. B22F 7/04
[52] U.S. Cl. .................... 428/610; 428/469; 428/472; 428/472.2; 228/121.1; 228/122.1
[58] Field of Search ........................ 428/610, 632, 428/469, 472, 472.2; 228/121.1, 122.1

[56] References Cited

U.S. PATENT DOCUMENTS

| | | | |
|---|---|---|---|
| 3,284,174 | 11/1966 | Zimmer | 228/122.1 X |
| 4,109,031 | 8/1978 | Marscher | 228/122.1 X |
| 5,561,321 | 10/1996 | Hirano et al. | 428/610 X |

*Primary Examiner*—Kenneth J. Ramsey
*Attorney, Agent, or Firm*—Hoffmann & Baron, LLP

[57] ABSTRACT

The sealing composition contains powders composed, by weight, of 70 to 90% of aluminium, 5 to 25% of silicon, 0 to 5% of silica and 0.1 to 5% of moderating metal, which are dispersed in a vehicle comprising an organic binder dissolved in a solvent and a mineral binder.

It is applied to the faces to be assembled of a ceramic part and of a refractory alloy or superalloy part and the whole is heated in order to eliminate said vehicle and form between the two parts a layer of mullite syncrystallized with the ceramic.

18 Claims, No Drawings

PROCESS FOR THE ASSEMBLY OF CERAMIC AND REFRACTORY ALLOY PARTS

The invention relates to the assembly of parts intended to withstand elevated temperatures, and more particularly of a ceramic part and a metal or refractory alloy part or superalloy part.

A metal or an alloy is described as refractory when it withstands elevated temperatures—while being if necessary protected against corrosion—on condition that it is not subjected to significant mechanical loads. A superalloy is distinguished from a refractory alloy in that it has good mechanical, in particular creep, strength at elevated temperatures.

A process currently used for the assembly of a ceramic and a metal is that called brazing, which consists in applying a metal in the molten state (brazing alloy), which is then solidified by cooling. The most common brazing alloys are the alloys Cu—Ti—Sn and Ag—Cu. Alloys possessing a relatively low melting point of between 600° and 850° C., and inert with respect to ceramics, are involved. The assembly obtained cannot be used at high temperature, since the brazing alloy melts again as soon as the corresponding temperature is reached, causing the parts to desolidify.

This remains true for the particular brazing processes described in FR-A-2 271 644 and FR-A-2 619 562, the latter using as brazing alloy aluminium, which melts at 660° C. and in addition burns at this temperature, that is to say oxidizes very violently, in the presence of oxygen. FR-A-2 636 621 and EP-A-0 422 343 propose brazing alloys having melting points of more than 900° C. Although the assemblies obtained withstand relatively elevated temperatures momentarily, oxidation or corrosion of the brazing alloys would lead to deterioration of the joint in the long term.

The only known technique allowing a stable connection to be obtained at high temperature between a metal part and a ceramic entails the formation of the ceramic by projection at the surface of the part. This technique is intended to protect a metallic superalloy substrate having phases γ and γ' from the thermal environment of the air stream of an aeronautical turbo-engine. First of all the superalloy is coated, by a physical method such as plasma projection or vapor phase deposition under electron bombardment, with a layer of MCrAlY alloy, where M represents the base metal of the superalloy, namely nickel and/or cobalt and/or iron, with a thickness of about 100 μm. The superalloy thus protected is then coated, by plasma projection, with about 300 μm of zirconium partly stabilized with yttria, that is to say containing about 8% by weight of yttria (yttrium oxide $Y_2O_3$). The good mechanical coupling of the yttrified zirconium deposit to the MCrAlY, which is combined with physico-chemical phenomena, permits a high degree of resistance to thermal shocks of this unit (1000 cycles of one hour at 1100° C. with cooling in five minutes to about 200° C.), despite a high differential of the expansion coefficients. This technique, described in detail in the literature, naturally does not allow the metal part to be assembled to a pre-existing ceramic part.

The aim of the invention is to provide a process permitting such an assembly which is stable at elevated temperatures.

The invention concerns in particular a process for assembling a first ceramic part and a second part of a material chosen from ceramics and refractory metallic materials and superalloys based on at least one metal chosen from nickel, cobalt, iron and platinum metals, wherein the ceramic which constitutes the first part or the two parts is capable of syncrystallizing, directly or indirectly, with mullite, in which process the two parts are juxtaposed, the gap which separates them being filled with a sealing composition containing fine particles of aluminium and of a moderating metal capable of forming an alloy with the latter so as to limit the high temperature reactivity of the aluminium in relation to the materials of said parts, and/or of a pre-formed alloy of these two metals, and optionally of at least one constituent chosen from silicon and silica, said particles being dispersed in a vehicle capable of maintaining them in position up to a temperature at which they react with one another and/or with said materials, and the whole is heated to a temperature sufficient to eliminate physically and/or chemically said vehicle and form between the two parts, by the reaction of said particles, a median layer of mullite connected to the ceramic part or to each ceramic part by a transition layer whose chemical composition evolves progressively, with continuity of crystalline structure, from that of the mullite to that of the part concerned, and where appropriate to the metal part by an intermediate layer containing mullite, silica and an aluminide of the base metal of the alloy, in concentrations which vary progressively between the median layer and the metal part.

Although the invention is more particularly intended for the assembly of a ceramic part and a metal part, it is equally suitable for the mutual assembly of two ceramic parts. In order that a ceramic may be assembled by the process according to the invention, it is necessary for it to be syncrystallizable with mullite $2SiO_2.3Al_2O_3$, that is to say that there exists, between the chemical composition of this ceramic and that of the mullite, a continuous range of crystallizable compositions, with continuity of crystalline structure in the whole of this range. The syncrystallization may be direct or indirect. In the second case, the intermediate layer passes through at least one particular formula other than those of the ceramic part and the mullite, for example $SiO_2$ for a silicon carbide part.

In cases where the part itself is of mullite, the progressive evolution of the chemical composition of the transition layer can be reduced to a homogeneity of this composition.

In the case of a metal part, an aluminization of the base metal and a disappearance of the metallic aluminium occurs, thus avoiding the drawbacks of the brazing alloys.

The species thus obtained withstand temperatures far higher than the melting temperatures of the ingredients of the sealing composition, and higher in certain cases than the melting temperature of the alloys to be assembled. Thus, the mullite decomposes at 1810° C. and the βONiAl phase melts at 1638° C., while the melting temperature of the nickel-base superalloys is about 1550° C.

Other additional or alternative characteristics of the invention are given below:

The second part is of nickel-base alloy and said aluminide is βNiAl.

The second part is of nickel-, cobalt- and/or iron-base alloy and has a coating containing at least one platinum metal. In this case, the aluminide of the intermediate layer is modified by the platinum metal.

The ceramic is chosen from alumina, zirconia, zirconia partly stabilized with yttria, silica, silicon, chromium and tungsten carbides, and mixtures of these compounds.

The moderating metal is chosen from chromium, nickel and iron and mixtures of the latter.

The fine particles of the sealing composition contain, by weight, 70 to 90% of aluminium, 5 to 25% of silicon, 0 to 5% of silica and 0.1 to 5% of moderating metal.

The fine particles of the sealing composition contain, by weight, 30 to 70% of aluminium, 0 to 25% of silicon, 0 to 10% of silica and 0.1 to 68% of moderating metal. Such a composition is particularly suitable when the second part is of a metallic material having a high affinity for aluminium, for example a largely pure platinum metal. In both cases, the aluminium and the moderating metal can be at least partly prealloyed.

Said vehicle comprises an organic binder dissolved in a solvent, which may be simply water, for forming at ambient temperature a viscous liquid with a deflocculating effect, and if necessary a mineral binder which is in the form of a viscous liquid at the decomposition temperature of the organic binder. The sealing composition can thus be spread after the manner of a paint on the surfaces to be solidified, and/or poured into a cavity in one of the parts intended to receive the other part, before or after the positioning of this other part. In particular, the mineral binder is superfluous when the cavity is closed towards the bottom so that the sealing composition is unable to flow during the thermal treatment. If necessary, two different sealing compositions can be applied to the two parts.

Similarly, it is possible to pour into the residual cavity obtained after the positioning a sealing composition different from that (those) applied previously to the two parts. In particular, the composition applied to a ceramic part may be adjusted in accordance with the chemical nature of the latter so as to promote syncrystallization.

The mineral binder is chosen from boric acid and phosphoric acid and their salts of chromium, aluminium and metals of group VIIIa of the periodic table, and mixtures of the latter. The elements constituting the cations of these compounds, and boron, are compatible with the powders of the sealing composition, and phosphorus is eliminated in the form of slag rejected at the free surface of the assembly joint.

After having juxtaposed the two parts, the solvent is evaporated in air at a temperature of less than 100° C., then the whole is heated, first of all if necessary in air at a temperature of less than 400° C. and sufficient to decompose the organic binder and bring the mineral binder where applicable to the liquid state, then in non-oxidizing atmosphere at a temperature of at least 1000° C. in order to eliminate any mineral binder and cause the powders of the sealing composition to react.

Before juxtaposing the two parts, there are applied to at least one of them one or more layers of sealing composition, each application being optionally followed by the whole or part of the evaporation, decomposition and elimination treatments.

The assembly is carried out without pressing the two parts against one another.

The invention also provides for a sealing composition suitable for implementing the process as defined above, containing fine particles of aluminium and of a moderating metal capable of forming an alloy with the latter so as to limit the high temperature reactivity of the aluminium in relation to the materials of said parts, and/or of a preformed alloy of these two metals, and optionally of at least one constituent chosen from silicon and silica, said particles being dispersed in a vehicle capable of maintaining them in position up to a temperature at which they react with one another and/or with said materials.

The invention is finally related to an assembly, in particular one obtained by the above process, comprising a first ceramic part and a second part of a material chosen from ceramics and refractory metallic materials and superalloys based on at least one metal chosen from nickel, cobalt, iron and platinum metals, and a sealing cement filling the gap between the two parts, containing a median layer of mullite connected to the ceramic part or to each ceramic part by a transition layer whose chemical composition evolves progressively, with continuity of crystalline structure, from that of the mullite to that of the part concerned, and where appropriate to the metal part by an intermediate layer containing mullite, silica and an aluminide of the base metal of the alloy, in concentrations which vary progressively between the median layer and the metal part.

EXAMPLE 1

The following mixture is prepared, the quantitative relations being given by weight:

12 parts of silicon powder whose grain size lies between 30 and 50 μm, 2.5 parts of silica powder whose grain size lies between 20 and 50 μm, 82.5 parts of aluminium powder whose grain size lies between 3 and 5 μm, 3 parts of chromium powder whose grain size lies between 10 and 20 μm.

These proportions are regarded as optimal for the assembly of an alumina part and a metal part, chromium being able to be replaced, either totally or partly, by nickel and/or iron.

This mixture is dispersed in an aqueous solution of ammonium polyacrylate marketed by the company COATEX under the name COATEX P 90. This solution contains an iron salt that limits the length of the polymer chains. It is used in a quantity sufficient to obtain a fluid paste, for example of the order of 50 ml for 100 g of powders. After homogenisation of the dispersion, it is diluted by a molar solution of boric acid in a quantity of the order of 250 ml for 100 g of powders. The aluminium powder, passivated by the ammonium polyacrylate, does not react with the acid solution. If the mixture is agitated, it has a texture and a fluidity similar to those of a paint, and this consistency is able to be adjusted by varying the quantity of acid solution. The dispersion is applied by brush to a plane face of a block of alumina. The part is then stoved at 80° C. for 30 minutes in order to eliminate water. After cooling, a second layer is produced under the same conditions. Baking in a confined atmosphere is then carried out, so as to limit the quantity of oxygen in contact with the sample, at 350° C. for 30 minutes. This operation makes it possible to destroy the organic dispersant and to melt the boric acid, which allows the powders, after the return to ambient temperature, to remain in contact with the substrate. The sample is then introduced into an electric oven under hydrogen atmosphere at 600° C. and raised to 1050° C. over four hours. The part is then cooled in air to ambient temperature. It is found that the ceramic is covered with a dark grey, highly adhesive deposit which withstands wet sand blasting at a pressure of 6 bar.

The same coatings and the same thermal treatments are carried out on a sample of nickel-base superalloy of the IN100 type, coated beforehand by electrolytic means with a 12 μm layer of an alloy composed of 80% of palladium and 20% of nickel by weight, and after wet sand blasting at a pressure of 6 bar. It is found, by micrographic sectional examination, that the alloy is covered with a layer of highly adhesive (Ni,Pd)Al containing a fine dispersion of silica. This coating, obtained without melting of the aluminium, is alumino-forming, that is to say it gives rise, in the presence of oxygen, to a protective film of alumina. To obtain it, there have been reproduced at the surface of the sample the conditions for a high activity aluminisation (it is the aluminium which diffuses towards the substrate), wherein chromium, which is eliminated in the soots after the baking under hydrogen, has served as moderating metal.

A new layer of the same sealing composition is applied to each of the two previous samples, and they are applied to one another. The unit thus obtained is subjected to the whole of the thermal treatments described above for the separate samples, the final treatment at 1050° C. being followed by a thermal shock from this temperature to ambient temperature in air. A metallographic section of the resulting assembly shows an extremely adhesive bond between the ceramic and the superalloy. There is distinguished, from the superalloy onwards:

- an inter-diffusion zone between the superalloy and the coating,
- a βNiAl coating modified by palladium, containing a fine dispersion of silica,
- an intermediate zone containing a small amount of chromium α deriving from the sealing composition, in which the proportion of aluminide falls progressively in favour of the mullite obtained by reaction between the aluminium powder, the oxygen of the boric acid (boron has combined with hydrogen to form boron hydride), the silicon powder, the silica powder and the aluminium of the substrate, and
- an inter-diffusion zone between the mullite and the alumina.

The same result can be obtained by the following simplified procedure.

The superalloy IN100 covered with the palladium-nickel coating is baked for two hours at 850° C. under a vacuum greater than $10^{-5}$ torr. The sample obtained, as well as the alumina sample previously sand blasted, receive two coats of sealing composition as described previously, but the separate samples do not undergo any thermal treatment other than the oven drying of the two successive layers.

The aluminium plate, with an area of 1 cm$^2$, is laid flat, with the coated face on top, and there is deposited on it a drop, that is about 3 to 4 ml, of sealing composition, which is crushed by means of a coated face of the superalloy slab. The series of thermal treatments described previously is then carried out on the unit at 80°, 350° and 1050° C. It is not necessary to apply a pressure of any kind to the parts to be assembled.

The assembly has been subjected to thermal cycles under oxidizing conditions: heating to 1100° C. in air for one hour, then cooling by blowing with air to about 200° C. in less than five minutes. After 500 cycles, it is found that the alumina is cracked, its resistance to thermal shocks being very weak compared with that of a metal alloy, but that the ceramic-metal bond still retains its cohesion. If a micrographic section is examined after the 500 thermal shocks, there is distinguished, from the superalloy onwards:

- the inter-diffusion zone between the coating and the superalloy, the thickness of which has risen slightly, the aluminide coating,
- a fine layer of aluminium, about 2 μm in thickness, adhering strongly to the mullite,
- an inter-diffusion zone between the mullite and the alumina.

The thermal cycles have increased the area of contact between the metal and the ceramic and consequently the solidity of the bond between the latter.

EXAMPLE 2

The simplified procedure of Example 1 is repeated, with the boric acid of the sealing composition being replaced with phosphoric acid H$_3$PO$_4$, and using a metal part of refractory nickel-base alloy, of the Hasteloy X type, coated with a layer of palladium-nickel alloy 10 μm thick.

No loss of cohesion is found after 500 oxidation cycles at 1100° C. with thermal shocks.

EXAMPLE 3

The same procedure as in Example 2 is followed, with the aluminium part being replaced with a silicon carbide part.

No loss of cohesion of the assembly is found after numerous oxidation cycles with thermal shocks.

EXAMPLE 4 to 8

These examples differ from Example 2 by the nature of the ceramic and of the alloy, as indicated in the table below.

| Example | Ceramic | Alloy |
|---|---|---|
| 4 | silica | Hasteloy X |
| 5 | partly stabilized zirconia | IN100 |
| 6 | partly stabilized zirconia | Hasteloy X |
| 7 | mullite | Hasteloy X |
| 8 | alumina | Pt 90% + Rh 10% by wt |

In all these cases a bond was obtained which was capable of withstanding at least 500 oxidation cycles with thermal shocks without any loss of cohesion being found, this number being raised to 1000 for Example 8.

EXAMPLE 9

With a view to the assembly of two ceramic, more particularly alumina parts, a sealing composition is prepared containing the same ingredients as that of Example 2, only the relative proportions of the powders being modified. The quantity of aluminium, which is no longer needed to aluminize an alloy, is reduced in favour of silicon and silica, so as to promote the formation of mullite. The proportions by weight are as follows:

silicon: 22, silica: 5, aluminium: 70, chromium: 3.

After having been cleaned by wet sand blasting at 6 bar, the surfaces to be assembled are covered with the dispersion and applied to one another. The unit undergoes one stoving for 30 min at 80° C., then another for 30 min at 350° C., and finally a baking for 5 hours under hydrogen at 1050° C. A bond between the two aluminium plates by a layer of mullite is thus obtained.

EXAMPLE 10

The same procedure as in Example 9 is followed, with one of the alumina parts being replaced with a mullite part. Following the treatment, the two plates are bonded to each other by a layer whose composition passes progressively from that of alumina to that of mullite.

EXAMPLES 11 to 13

These three examples illustrate the assembly of parts having contact surfaces which are not plane.

Example 11

It is intended to coat an alumina cylinder with a platinum alloy containing 10% by weight of iridium. Instead of carrying out a metal deposition on the surface of the alumina, the alumina part is to be assembled inside a preformed metal tube. After the inside of the platinum tube containing iridium has been cleaned by wet sand blasting at 6 bar, a suitable quantity of the sealing composition described in Example 2 is introduced, after which the alumina cylinder is introduced, the composition occupying the annular gap between the two parts. The same thermal treatments are then performed as on the assembly of Example 2. The unit obtained can withstand being stood for several thousands of hours in a corrosive liquid medium at a temperature of 1100 ° C.

EXAMPLE 12

It is intended to fix silicon carbide implants in holes made in a block of Hasteloy X refractory alloy, these implants and these holes being threaded for a good mechanical bond. Because of the wide difference in the coefficients of thermal expansion, it is necessary to leave considerable play between the parts, so that the purely mechanical bond does not suffice to ensure a reliable assembly, since the implants are capable of unscrewing as a result of vibrations. In order to resolve this problem, the process according to the invention is resorted to. After cleaning by wet sand blasting, the composition of Example 2 is injected into the threaded hole with the aid of a syringe, and the ceramic part is then screwed in. After the thermal treatments described above, an insert capable of supporting a 500 g metal block at high temperature is obtained.

EXAMPLE 13

It is intended to fix smooth, Hasteloy X refractory alloy rods in a blind hole in an alumina part. In order to prevent the appearance of porosities due to evaporation of the solvent, the quantity of water contained in the sealing composition is reduced. To this end, after having prepared the dispersion of the powder mixture in the COATEX P 90 solution, as in Example 2, no water is added, but only phosphoric acid in order to obtain a fluid paste with a 0.2M phosphoric acid content. Since aluminium in powder form is highly lubricating, it is easy to introduce the metal insert into the hole filled with this paste. After the conventional thermal treatments, as assembly usable at high temperature is obtained.

EXAMPLE 14

This example concerns the assembly of an alumina rod and a pure platinum tube of relatively high weight.

An initial attempt was made by proceeding as in Example 11, after having previously treated the alumina rod with the composition described in Example 9. A violent reaction between the aluminium and the platinum was observed in this way.

A particular sealing composition was then employed in which the silicon, silica, aluminium and moderating metal powders were replaced with a single β-NaAl powder with a grain size of 5 μm.

In an initial stage, the alumina rod alone is treated as described in Example 2, but using the sealing composition of Example 9.

For the assembly proper, the sealing composition is prepared by deflocculating the β-NiAl powder in a COATEX P90 solution so as to obtain a broth which is diluted with deionised water in order to form a composition capable of being applied with a brush. The alumina rod treated and heated to 80° C. is coated with three layers of this composition, without intermediate drying operations. The thickness thus deposited is of the order of 100 μm, representing twice the annular play between the platinum tube and the alumina rod. The rod is then inserted into the tube by rotating the latter, so as to eliminate the surplus sealing composition thickness.

The unit is then introduced into an electric oven under hydrogen atmosphere at 650° C. and the temperature is raised progressively at the rate of 5° C./min up to 1050° C. After a period of ten hours at this last temperature, the unit is cooled in air.

The bond between the two parts is based on the following two phenomena:

- diffusion in the solid state between the aluminium enriched surface of the alumina and the nickel aluminide, on the one hand,
- diffusion in the solid state between the platinum and the nickel aluminide, on the other.

In this example, two of the elements used in the other examples have been dispensed with, namely the presence of a mineral binder and the baking to eliminate the organic binder (30 min at 350° C. in confined atmosphere). The mineral binder is useful, in fact, when running of the sealing composition may occur, which is not the case here since the binding element (nickel aluminide) is confined to the interior of a tube. In order to prevent loss of the sealing composition, it suffices to place the tube and its ceramic insert vertically in the oven, the open face being directed upwards. As a consequence, the elimination of the organic binder takes place in the form of $CH_4$ and $H_2O$ during the initial moments of the baking under hydrogen towards 650° to 700° C. In addition, this method of elimination prevents the formation of a passive film of $Al_2O_3$ at the surface of the nickel aluminide (it is an alumino-forming alloy) and thus promotes the diffusion of this particular compound with the platinum on the one hand and, on the other, with the aluminium-enriched surface of the alumina rod.

Two samples prepared in this way were baked in oxidizing atmosphere at 1258° C. for 100 hours. No anomalies were found.

We claim:

1. Process for the assembly of a first ceramic part and a second part of a material chosen from ceramics and refractory metallic materials and super alloys based on at least one metal chosen from nickel, cobalt, iron and platinum metals, wherein the ceramic which constitutes the first part or the two parts is capable of syncrystallizing, directly or indirectly, with mullite, in which process the parts are juxtaposed, sealing composition containing fine particles of aluminium and of a moderating metal capable of forming an alloy with the aluminium so as to limit the high temperature reactivity of the aluminium in relation to the materials of said parts, and/or of a preformed alloy of these two metals, and optionally at least one constituent chosen from silicon and silica, said particles being dispersed in a vehicle capable of maintaining them in position up to a temperature at which they react with one another and/or with said materials, and the whole is heated to a temperature sufficient to eliminate physically and/or chemically said vehicle and form between the two parts, by the reaction of said particles, a median layer of mullite connected to the ceramic part or to each ceramic part by a transition layer whose chemical composition evolves progressively, with continuity of crystalline structure, from that of the mullite to that of the part concerned, and when the second part is metal by an intermediate layer containing mullite, silica and an aluminide of the base metal of the metal part, in concentrations which vary progressively between the median layer and the metal part.

2. Process according to claim 1, characterised in that the second part is of nickel-base alloy and said aluminide is βNiAl.

3. Process according to claim 1, characterised in that the second part is of nickel-, cobalt- and/or iron-base alloy and has a coating containing at least one platinum metal.

4. Process according to claim 1, characterised in that the ceramic is chosen from alumina, zirconia, zirconia partly stabilized with yttria, silica, silicon, chromium and tungsten carbides, and mixtures of these compounds.

5. Process according to claim 1, characterised in that the moderating metal is chosen from chromium, nickel and iron and mixtures of the latter.

6. Process according to claim 1, characterised in that the fine particles of the sealing composition contain, by weight, 70 to 90% of aluminum, 5 to 25% of silicon, 0 to 5% of silica and 0.1 to 5% of moderating metal.

7. Process according to claim 1, in particular for the assembly of a second part of a metallic material having a high affinity for aluminum, characterised in that the fine particles of the sealing composition contain, by weight, 30 to 70% of aluminum, 0 to 25% of silicon, 0 to 10% of silica and 0.1 to 68% of moderating metal.

8. Process according to claim 1, characterised in that said vehicle comprises an organic binder dissolved in a solvent for forming at ambient temperature a viscous liquid with a deflocculating effect, and if necessary a mineral binder which is in the form of a viscous liquid at the decomposition temperature of the organic binder.

9. Process according to claim 8, characterised in that said solvent is water.

10. Process according to claim 8, characterised in that the mineral binder is chosen from boric acid and phosphoric acid and their salts of chromium, of aluminum and of metals of group VIIIa of the periodic table, and mixtures of the latter.

11. Process according to claim 8, characterised in that, after having juxtaposed the two parts, the solvent is evaporated in air at a temperature of less than 100° C., then the unit is heated, first of all if necessary in air at a temperature of less than 400° C. and sufficient to decompose the organic binder and bring the mineral binder where applicable to the liquid state, then in non-oxidizing atmosphere at a temperature of at least 1000° C. in order to eliminate any mineral binder and cause the powders of the sealing composition to react.

12. Process according to claim 11, characterised in that, before juxtaposing the two parts, there are applied to at least one of them one or more layers of sealing composition, each application being optionally followed by the whole or part of the evaporation, decomposition and elimination treatments.

13. Process according to claim 1, characterised in that the assembly is carried out without pressing the two parts against one another.

14. Assembly comprising a first ceramic part and a second part of a material chosen from ceramics and refractory metallic materials and superalloys based on at least one metal chosen from nickel, cobalt, iron and platinum metals, and a sealing cement filling the gap between the two parts, containing a median layer of mullite connected to the ceramic part or to each ceramic part by a transition layer whose chemical composition evolves progressively, with continuity of crystalline structure, from that of the mullite to that of the part concerned, and when the second part is metal by an intermediate layer containing mullite, silica and an aluminide of the base metal of the metal part, in concentrations which vary progressively between the median layer and the metal part.

15. Assembly according to claim 14, characterised in that it is obtained by the process according to claim 1.

16. Process for assembling a first ceramic part and a second part of a material selected from the group consisting of ceramics, refractory metallic materials and superalloys based on at least one metal chosen from nickel, cobalt, iron and platinum metals, wherein the ceramic of the first part or second part is capable of syncrystallizing with mullite, the process comprising the steps of:

juxtaposing the first and second parts with a sealing composition therebetween, the sealing composition containing fine particles of: (a) aluminium and of a moderating metal capable of forming an alloy with the aluminium so as to limit the high temperature reactivity of the aluminium in relation to the materials of said parts, or (b) a pre-formed alloy of the aluminium and the moderating metal, the particles being dispersed in a vehicle capable of maintaining the particles in position up to a temperature at which they react with one another or with said materials; and heating the juxtaposed first ceramic part and second part to a temperature sufficient to eliminate the vehicle thereby forming between the first part and second part a median layer of mullite connected to the first part and second part, when the second part is ceramic, by a transition layer having a continuous crystalline structure and a chemical composition evolving progressively from mullite to that of the part concerned, and when the second part is metal the median layer is connected by an intermediate layer containing mullite, silica and an aluminide of the base metal of the metal part, in concentrations that vary progressively between the median layer and the metal part.

17. Process according to claim 16, wherein the fine particles of the sealing composition further comprise at least one constituent selected from the group consisting of silicon and silica.

18. Process according to claim 17, wherein the fine particles of the sealing composition comprise, by weight, 70 to 90% of aluminium, 5 to 25% of silicon, 0 to 5% of silica and 0.1 to 5% moderating metal, the moderating metal being selected from the group consisting of chromium, nickel, iron and mixtures thereof.

* * * * *

UNITED STATES PATENT AND TRADEMARK OFFICE
CERTIFICATE OF CORRECTION

PATENT NO. : 5,776,620
DATED : July 7, 1998
INVENTOR(S) : Josso et al.

It is certified that error appears in the above-identified patent and that said Letters Patent is hereby corrected as shown below:

In Column 2, Line 48, the patent now reads "and the $\beta$ONiAl phase"; this should read --and the $\beta$NiAl phase--.

In Column 6, Line 21, the patent now reads "Example 4 to 8"; this should read --Examples 4 to 8--.

In Column 8, Line 40, the patent now reads "of $CH_4$ and $H_{2o}$ during"; this should read --of $CH_4$ and $H_2O$ during--.

In Column 10, Line 9 and 10, the patent now reads "mullite connected to the ceramic part or to each ceramic part by a transition layer whose"; this should read-- mullite which is connected to the first ceramic part and to the second part when the same is ceramic, by a transition layer whose--.

Column 10, Line 13, the patent now reads "part concerned, and when"; this should read --part concerned, and which, when--.

UNITED STATES PATENT AND TRADEMARK OFFICE
CERTIFICATE OF CORRECTION

PATENT NO. : 5,776,620
DATED : July 7, 1998
INVENTOR(S) : Josso et al.

It is certified that error appears in the above-identified patent and that said Letters Patent is hereby corrected as shown below:

Column 10, Line 13 & 14, the patent now reads "part is metal by an intermediate layer"; this should read --part is metal, the median layer is connected to the metal part by an intermediate layer--.

Signed and Sealed this

Second Day of February, 1999

Attest:

Attesting Officer

*Acting Commissioner of Patents and Trademarks*